United States Patent
Bonasia et al.

(10) Patent No.: US 6,289,404 B1
(45) Date of Patent: *Sep. 11, 2001

(54) APPARATUS FOR AND METHOD OF PLACING A NODE IN AN UNCONFIGURED STATE

(75) Inventors: Gaetano Bonasia, Bronx; David P. Eckel, Eaton's Neck; Alfred J. Lombardi, LaGrangeville; Selin Tansi-Glickman, New York; Paul Soccoli, Flushing, all of NY (US); Damon Bruccoleri, Long Branch, NJ (US); Alan Granger, Anderson, SC (US)

(73) Assignee: Leviton Manufacturing Co., Inc., Little Neck, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,916

(22) Filed: May 18, 1998

(51) Int. Cl.[7] .................................................. G06F 15/177
(52) U.S. Cl. ........................................... 710/104; 713/100
(58) Field of Search .......................... 710/10, 104; 713/1, 713/2, 100

(56) References Cited

U.S. PATENT DOCUMENTS

| | | | |
|---|---|---|---|
| 5,327,426 | * | 7/1994 | Dolin, Jr. et al. ................... 370/235 |
| 5,420,572 | * | 5/1995 | Dolin, Jr. et al. ............... 340/825.22 |
| 5,532,592 | * | 7/1996 | Colclough ............................ 324/248 |
| 5,752,073 | * | 5/1998 | Gray, III et al. ........................ 712/35 |
| 5,966,753 | * | 10/1999 | Gauthier et al. .......................... 4/623 |

* cited by examiner

Primary Examiner—Paul R. Myers
(74) Attorney, Agent, or Firm—Paul J. Sutton

(57) ABSTRACT

An apparatus and method place a node in an unconfigured state, with the apparatus and method functioning within an electrical network including a plurality of such nodes. Each node is adapted to communicate over a communications network. Such electrical networks can be implemented utilizing the CEBus (EIA-600 standard) or LonWorks communications systems. The apparatus and method operate in a LonWorks communications system by placing a node in an unconfigured state for installation or maintenance purposes. A push button switch is in a suitable location in the apparatus to be accessed by a user. The switch is coupled between a service pin of a Neuron chip and ground. Under control of an executable application program, pressing the switch for a predetermined length of time causes the node to be placed in the unconfigured state.

20 Claims, 3 Drawing Sheets

APPARATUS FOR AND METHOD OF PLACING A NODE IN AN UNCONFIGURED STATE

FIELD OF THE INVENTION

The present invention relates to electrical devices and more particularly relates to an apparatus for and method of inhibiting an electrical control device.

BACKGROUND OF THE INVENTION

A growing trend within the electrical device industry is to enable previously stand alone electrical devices, such as sensors and lighting control devices, to communicate with each other over some type of communications network. Previously, sensor, switch and control devices communicated using point to point connections. Nowadays, manufacturers are building into these devices communication means to enable them to communicate over local area networks (LANs). A variety of systems are currently commercially available which electrical device manufacturers can integrate into their products to enable them to communicate over a network.

One such system is the CEBus system which has been made an EIA standard, known as the EIA 600 standard, which was originally developed by Intellon Corp. A second system is the LonWorks system commercially available from and developed by Echelon Corp. Both the CEBus and LonWorks systems specify physical and link layer means for communicating over a variety of different media including power line, coaxial cable, fiber optic cable, radio frequency (RF), infrared (IR) and twisted pair cable.

In connection with nodes adapted to operate in the LonWorks system, there are three well defined states a LonWorks node can be in at any time. The three standard node states that a Neuron chip can be in will now briefly be described. For a more in depth description of the various node states, the reader is directed to the Neuron C Reference Guide and the Neuron C Programmer's Guide. The following applies to the Neuron IC family, including the 3120 and 3150 chip families manufactured by Motorola, Inc., Schaumburg, Ill.

1. Applicationless State

In this node state, the Neuron chip does not have an executable application program stored in memory, i.e., with the 3150, in either on or off-chip memory and with the 3120 in on chip memory only.

The Neuron chip also cannot communicate with other nodes in the network. However, an application can be installed in several ways: (1) LonBuilder, source code (.nc) or executable file (.nxe) are needed (2) NodeBuilder, source code (.nc) or executable file (.nxe) are needed (3) a 3120 family programmer and executable file (.nxe) are needed (4) a memory IC programmer for a 3150 application and an executable file (.nxe) are needed or (5) a network management tool and executable file (.nxe) are needed.

In addition, in the applicationless mode, the Neuron chip cannot process any instructions supplied by accompanying hardware or software.

In this node state, an LED connected to the service pin of the Neuron chip will be steady on.

2. Unconfigured State

In this node state, the Neuron chip has an executable application program stored in its memory, i.e., with the 3150, in either on or off-chip memory and with the 3120 in on chip memory only.

The Neuron chip cannot communicate with other nodes in the network. However, the Neuron chip can process instructions supplied by accompanying hardware and/or software.

Further, a new executable application program can be installed. In a LonWorks system a node will be considered in a configured state once an application is installed.

In this node state, an LED connected to the service pin of the Neuron chip will flash at a rate of ½ Hz.

3. Configured State

In this node state, the Neuron chip has an executable application program stored in its memory, i.e., with the 3150, in either on or off-chip memory and with the 3120 in on chip memory only.

Further, the Neuron chip can communicate with other nodes in the network after it is properly bound utilizing a suitable network management tool and a .XIF definition file.

In addition, the Neuron chip can also process any instructions provided by accompanying hardware and/or software. Also, a new executable application program can be installed on the node.

In this node state, an LED connected to the service pin of the Neuron chip is off.

Sometimes it is desirable to be able to place a node in the unconfigured state. This may occur at the time of installation or at any time during the normal operation of the node. One way of placing a node in the unconfigured state is to connect a switch to one of the I/O pins provided on the Neuron chip. Under suitable program control, the position of the switch can be periodically sensed and the node placed in the unconfigured state in accordance thereto. The problem with this approach is that the application software needed to perform this function may be located external to the Neuron chip. The application software will not run when the Neuron chip is in the applicationless mode state or if the application software located externally is not running. In addition, when the Neuron chip is placed in the unconfigured state, the application software stops running and all communications via the I/O pins ceases.

When the Neuron chip is this state, i.e., unconfigured or applicationless, the service pin must be grounded internally so that an application can be installed and/or the Neuron chip can be configured. Typically, this can only be accomplished while the electrical device is opened but yet still plugged into the electrical wall socket.

Further, if the application software located externally to the Neuron chip is not running, then the Neuron chip cannot receive messages from any of the I/O pins.

Other prior art methods of placing a node in an unconfigured state function only during chip power up or a reset and will not permit the node to be placed in the unconfigured state at any arbitrary time.

SUMMARY OF THE INVENTION

The present invention is an apparatus for and method of placing a node in an unconfigured state that overcomes the problems associated with prior art solutions. The present invention is intended to function within an electrical network that is made up of a plurality of nodes wherein each node is adapted to communicate over a communications network. Such electrical networks can be implemented, for example, utilizing the CEBus (EIA-600 standard) or LonWorks communications systems.

The present invention has particular applicability to LonWorks compatible systems whereby a node can be placed in an unconfigured state for installation or maintenance purposes. The invention comprises combination apparatus and method for permitting a user, e.g., installer or technician, to place a node in the unconfigured state without requiring opening of the electrical device itself. This greatly eases the binding process for installers utilizing network management tools. A push button switch is provided in a suitable location in the device to permit access by a user.

The present invention directly utilizes the service pin on the Neuron chip to implement the 'go unconfigured' method. The switch is coupled between the service pin of the Neuron chip and ground potential. Under control of a suitably written executable application program which resides entirely on the Neuron chip, pressing the switch for a predetermined length of time causes the node to be placed in the unconfigured state.

The electrical device, i.e., node, embodying the present invention can be placed in the unconfigured state at any time the user desires regardless of the current state of the node. Thus, an application can be updated and installed no matter that state the node is in. In addition, a reset does not need to be performed to enable the method.

Further, the method is available at the node itself and does not require a user to access equipment remotely located from the node. The present invention permits a user to force a node to 'go unconfigured,' i.e., placed in an unconfigured state, without requiring the opening of an electrical device to ground processor pins, re-wiring, resetting, power downs or other irritating actions. Thus, the present invention eliminates possible hazardous conditions that may arise in the absence of the present invention. All that is required of a user is to press a button for a predetermined length of time during the normal operation of the node.

There is therefore provided in accordance with the present invention a method of placing a node in an unconfigured state, the method comprising the steps of providing input means for receiving a command from a user, waiting a predetermined length of time after the command is received and placing the node in the unconfigured state if the predetermined length of time passes and the command is still present at the input means.

The method further comprises the step of not placing the node in the unconfigured state if the command is removed from the input means at any time during the predetermined length of time.

There is also provided in accordance with the present invention an apparatus for placing a node in an unconfigured state comprising input means for receiving a command from a user, means for waiting a predetermined length of time after the command is received and means for placing the node in the unconfigured state if after the predetermined length of time the command is still present at the input means.

In addition, there is provided in accordance with the present invention, in a node including a Neuron chip, the Neuron chip part of a LonWorks compatible system, the Neuron chip having a service pin electrically coupled to a switch, a method of placing the node in an unconfigured state, the method comprising the steps of detecting when the switch is depressed thus causing the logic level at the service pin to go low, waiting a predetermined length of time, placing the node in the unconfigured state if after the predetermined length of time the logic level at the service pin is still low.

Further, there is provided in accordance with the present invention an apparatus for placing a node in the unconfigured state, the node including a Neuron chip, the Neuron chip being part of a LonWorks compatible system, the Neuron chip having a service pin electrically coupled to a switch, the apparatus comprising detection means for detecting when the switch is depressed thus causing the logic level at the service pin to go low, timer means for counting a predetermined length of time, means for placing the node in the unconfigured state if after the predetermined length of time the logic level at the service pin is still low.

In addition, there is provided in accordance with the present invention an electrical device connected to a LonWorks compatible communication system, the electrical device including a Neuron chip having a service pin, the electrical device comprising a housing, a switch mounted on the housing so as to permit access thereto by a user, the switch connected between the service pin and ground potential, detection means for detecting when the logic level at the service pin goes low, timer means for counting a predetermined length of time, means for placing the node in the unconfigured state if after the predetermined length of time the logic level at the service pin is still low.

BRIEF DESCRIPTION OF THE DRAWINGS

The invention is herein described, by way of example only, with reference to the accompanying drawings, wherein.

DETAILED DESCRIPTION OF THE INVENTION

Figure 1:
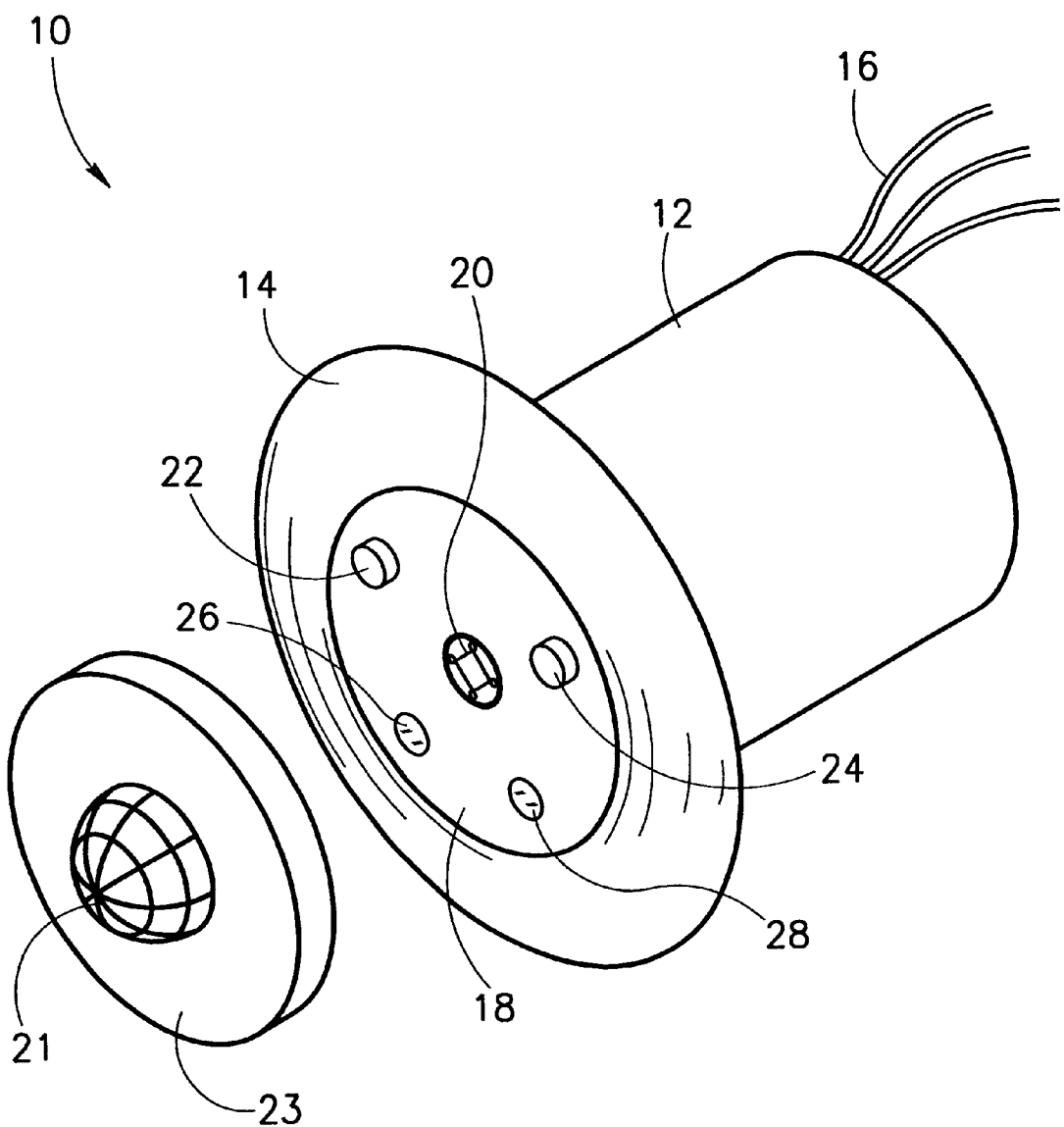
FIG. 1 is a perspective plan view illustrating an example electrical device housing the apparatus of the present invention.

The present invention is an apparatus for and a method of placing a node in an unconfigured state. The invention has applications whenever an electrical device needs to be placed in a certain known state such as an unconfigured state. The present invention has particular applicability in embedded control systems such as the Intellon CEBus system and the Echelon LonWorks system. The following disclosure is presented in the context of the LonWorks control system including illustrative examples showing a complete hardware and software implementation using the Neuron integrated circuit (IC) manufactured by Motorola, Inc. A detailed description of the Neuron chip family can be found in the Neuron Chip Data Book, Echelon Corporation, Pal Alto, Calif. Although, the present invention can be adapted to operate with a wide variety of microprocessors, for illustrative purposes, the example presented herein utilizes the Neuron chip.

Further, the present invention is shown here adapted to operate within a ceiling mount occupancy sensor that is operative on the LonWorks system. One skilled in the electrical art, however, could readily adapt the invention to numerous other types of electrical devices. In particular, the invention is commercially available in the LonWorks system capable series of electrical device products manufactured by Leviton Manufacturing Co., Inc., Little Neck, N.Y.

A major advantage of the present invention is that it provides an installer of LonWorks based systems that comprises a plurality of nodes to easily place the electrical device (the node) in an unconfigured state utilizing the same button that is used is make a service request. Thus, the number of unique buttons that must be installed in each node is reduced.

When the device is in the configured node state (also known as the normal operating mode state), the device is considered configured, the application is running and the configuration is considered valid. It is only in this state that both local and network derived messages destined for the application software layer are received. In the other states, i.e., the application-less and unconfigured states, these messages are discarded and the node status indicator is off. The node status indicator is typically a service light emitting diode (LED) that is used to indicate to a user the status of the node, and is described in more detail hereinbelow.

A device is referred to as configured if it is either in the hard off-line mode (i.e., an application is loaded but not running) or in the configured node state as described above. A node is considered unconfigured if it is either application-less or in the unconfigured state, i.e., no valid configuration in either case.

Utilizing the present invention, a user can force a device into the unconfigured state so that it can be re-bound to the network, i.e., the device must be 'reset' within the LonWorks system.

More particularly, the term going unconfigured, is defined as having the execution application program loaded but without the configuration available. The configuration may either be (1) not loaded (2) being re-loaded or (3) deemed bad due to a configuration checksum error.

In a LonWorks device, an executable application program can place its own node into the unconfigured state by calling the Neuron C built in function 'go_unconfigured( )'. Using this built in function, an application program can determine, based on various parameters, whether or not an application should enter this state. When the device does enter the unconfigured state, the Node Status Indicator flashes at a rate of once per second.

The present invention utilizes the service pin of a Neuron IC to place the node in an unconfigured state. Under control of the firmware built into the Neuron chip, the service pin is used during the configuration, installation and maintenance of the node embodying the Neuron chip. The firmware flashes an LED suitably connected to the service pin at a rate of ½ Hz when the Neuron chip has not been configured with network address information. When the service pin is grounded, the Neuron chip transmits a network management message containing its 48 bit unique ID on the network. The information contained within the message can then be utilized by a network management device to install and configure the node. The Neuron chip checks the state of the service pin on a periodic basis by the network processor firmware within the chip. Normally, the service pin is active low.

A perspective plan view illustrating an example electrical device housing the apparatus of the present invention is shown in FIG. 1. The example electrical device depicted is a passive infrared (PIR) ceiling mount occupancy sensor which responds to movement by detecting changes in infrared emissions within its field of view. The sensor will turn lights on when motion is detected and switch lights off if no motion is detected after a predetermined period of time. Note that although the invention is shown here embodied in an occupancy sensor, one skilled in the art could readily adapt the invention to other type of electrical devices.

The occupancy sensor, generally referenced 10, comprises a housing 12, a circular disk 14 having a hollow center, a user interface panel 18 (accessible by an installer or other maintenance personnel) and a plurality of wires 16 extending from the rear of the device for connection to a source of electrical power and the LonWorks or other suitable communications network. In addition, the device 10 comprises a PIR sensor assembly 20, circular cover plate 23 and a domed lens 21. The device 10 also comprises two buttons 22, 24 and two visual indicators 26, 28, which may be LEDs. Button 22 functions as an off/auto button and button 24 functions as a combination service request/go unconfigured button. The LED 26 shows the occupancy status and the LED 28 shows the service status, i.e., node status indication. The two LEDs 26, 28 may optionally be different colors such as red for LED 26 and yellow for LED 28.

The off/auto button 22 is used to place the device 10 into the off state or the auto state. In the off state, the device will not respond to movement within its field of view and will not transmit occupancy messages onto the network to other devices. When the device is in the auto state, it responds to movement within its field of view and transmits occupancy messages to other nodes on the network.

The service request/go unconfigured button 24 performs two functions. When the service request/go unconfigured button 24 is pressed momentarily, e.g., for one second, the device 10 performs normal service pin functions. However, when the service request/go unconfigured button 24 is pressed for more than a certain period of time, e.g., six seconds, the device will be placed into the unconfigured state. Thus, a user may issue a command to the device, via the button 24 which functions as an input means, telling it to enter the unconfigured state. The software controlling the button can be adapted to not place the device in the unconfigured state if the command is continuously present without interruption at the input means.

Although the six second time period is somewhat arbitrary, the time period selected should be sufficiently long enough so that it can be ascertained with reasonable certainty that any user who presses the button has done so consciously and willfully. Thus, the device should require that a user hold the button pressed for an extended period of time such as six seconds.

In addition, the button can optionally be placed on the panel face 18 behind the removable lens 21. In this case, it is intended that the button only be used by an electrician or other technician suitably trained to handle LonWorks system devices. Alternative embodiments may place the location of the service request/go unconfigured button 24 out of reach of the everyday user's normal reach and may optionally require the use of a special tool to access the button.

Figure 2:
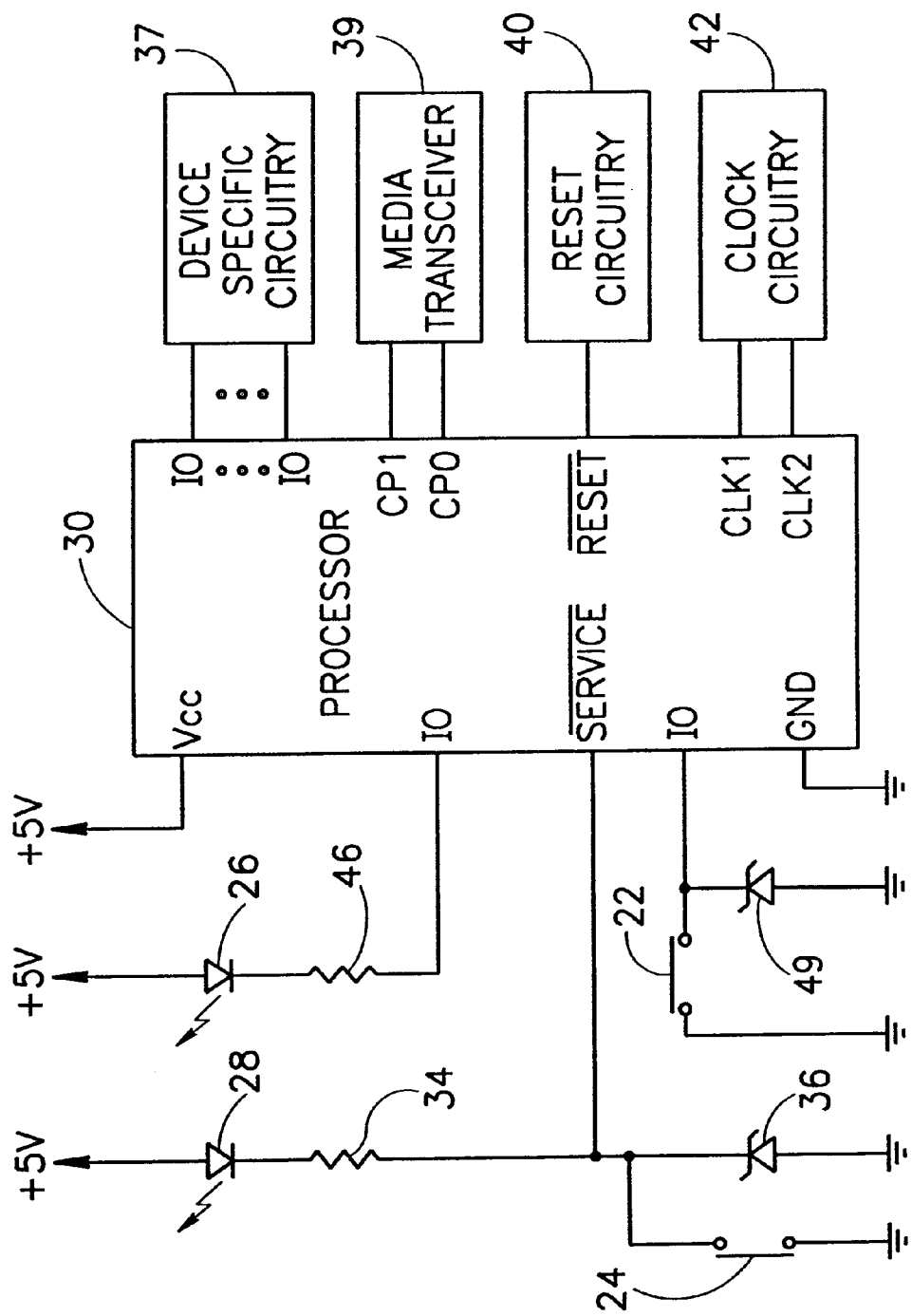
FIG. 2 is a schematic diagram illustrating an example circuit for placing a node in an unconfigured state.

A schematic diagram illustrating an example circuit for placing a node in an unconfigured state is shown in FIG. 2. The core of the circuit comprises a processor 30 which in this example is a Neuron chip from the 3120 or 3150 family of Neuron IC devices manufactured by Motorola, Inc., Schaumburg, Ill. The Neuron chips are VLSI devices that permit low cost implementations of local operating network applications. They contain the necessary hardware and firmware to provide the key functions for processing inputs from sensors and control devices intelligently and for propagating control information across a variety of network media.

The Neuron chip comprises a plurality of general purpose I/O pins to which device specific circuitry 37 can be connected. An interface to a media specific transceiver circuit 39 is also included. Examples of the media transceiver 39 include the FTT-10A Free Topology Twisted Pair Transceiver and the PLT-10A Power Line Transceiver manufactured by Echelon Corporation, Palo Alto, Calif. Reset circuitry 40 connects to the reset pins provided by the Neuron chip and provides reset functionality for the device 10. In addition, clock circuitry 42 connects to the clock pins of the Neuron chip and provides the clock signal source for the device 10. Examples of the media transceiver 39, reset circuitry 40 and clock circuitry 42 can be found in the Motorola LonWorks Technology Device Data Book, incorporated herein by reference.

The occupancy LED 26 is connected via a series resistor 46 to one of the I/O pins on the Neuron chip 30. As described previously, the occupancy LED functions to indicate the occupancy status of the area within the field of view of the device 10.

The service LED 28 is connected via a series resister 34 to the service pin of the Neuron chip 30. The service LED 28 functions to indicate the state the particular node is presently in, i.e., applicationless: steady on, unconfigured: flashing or configured: off. Note that the service pin functions as both an input and an output pin. As an input pin, the on chip firmware periodically samples the state of the service pin. A momentary push button type switch 24 is connected between the service pin and ground. A zener diode 36 connected between the service pin and ground prevents the voltage on the service pin from exceeding the zener threshold voltage.

A momentary push button switch 22 is connected between another I/O pin and ground. A zener diode 49 prevents the voltage on the I/O pin from exceeding the zener threshold voltage. The push button switch 22 functions as the off/auto switch described hereinabove. A software loop in the application program periodically checks for changes to the state of the I/O pin to determine whether the device should placed into the off state of the auto state.

Figure 3:
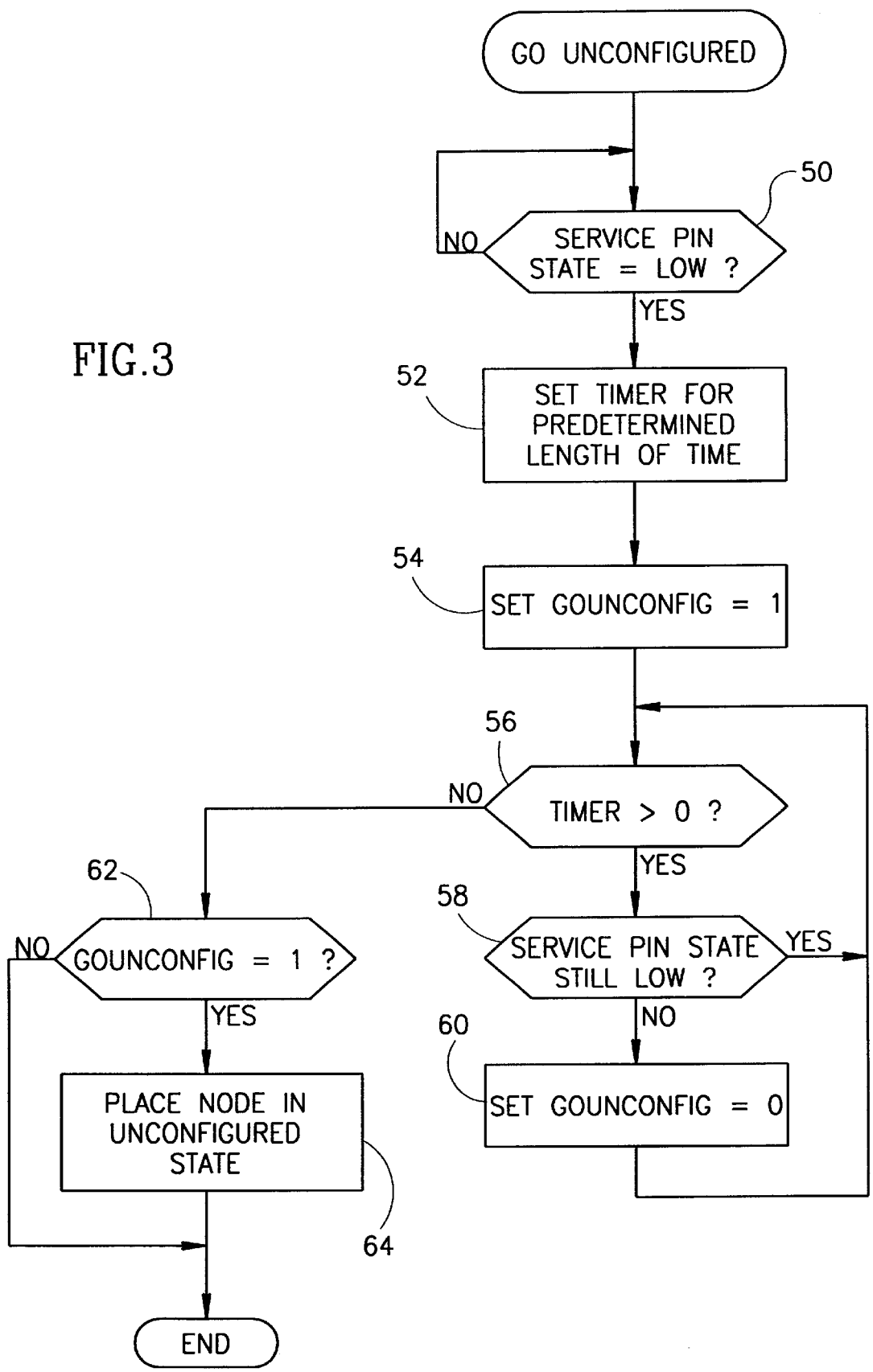
FIG. 3 is a flow diagram illustrating the method of the present invention for placing a node in an unconfigured state.

A flow diagram illustrating the method of the present invention for placing a node in an unconfigured state is shown in FIG. 3. Note that the following method can be implemented within a Neuron C 'when' statement as presented below in Listing 1. The first step in the method is to check whether the service pin is in the low state (step 50). The service pin is in the low state when a user presses the push button switch 24 (FIG. 2) which connects the service pin to ground potential. Once a low on the service pin is detected, a timer is set for a predetermined period of time, e.g., six seconds (step 52). The variable GOUNCONFIG is set equal to 1 (step 54). This variable is used to indicate whether the user held the service request/go unconfigured button down for the entire six seconds.

The device then checks for the timer to expire (step 56). If the timer has not yet expired the state of the service pin is sampled. If it is sill low, i.e., the service request/go unconfigured button is still being pressed, the timer continues to be checked (step 58). If the state of the service pin is found to be high, i.e., the service request/go unconfigured button has been released before the time period has expired, the variable GOUNCONFIG is set equal to 0 (step 60) and control returns to step 56.

When the timer expires, the value of the variable GOUNCONFIG is examined (step 62). If GOUNCONFIG equals 0, the routine reset_node( ) executes which functions to reset the device (step 63). The device is not placed in the unconfigured state since the service request/go unconfigured button was not depressed for at least the predetermined period of time. However, if GOUNCONFIG is equal to 1, the device is placed in the unconfigured state (step 64). In the Neuron chip family this can be accomplished by executing the built in Neuron C function 'go_unconfigured( )'.

As an aid to illustrate an example of one embodiment of the present invention, the source code listing for implementing a six second go unconfigured function is presented below as Listing 1. The source code listing is written in the LonWorks Neuron C language. Further details on the LonWorks Neuron C language can be found in the Neuron C Reference Guide and the Neuron C Programmer's Guide, both published by Echelon Corporation, Palo Alto, Calif. Note that in place of six seconds, the following source code listing can implement any desired delay time period simply by setting the variable unconfig_timer according to the following.

unconfig_timer=$D \times 1000$ wherein the value D is the predetermined length of time in units of seconds that the user must hold the service request/go unconfigured button down for in order to cause the device to be placed in the unconfigured state.

The following source code listing utilizes the built in Neuron C function 'service_pin_state( )' within a 'when' statement. The 'service_pin_state( )' function permits an application to read the state of the service pin. A state of 0 or 1 is returned whereby a value of 1 indicates the service pin is at a logic zero and a value of 0 indicates the service pin is at a logic one.

---

Listing 1: Source Code For Six Second Go Unconfigured

```
mtimer unconfig_timer;
//      Enter this statement when the service pin is pressed.
//      When the go unconfigured state is processed, the node
//      will be in an unconfigured state. The node will not be able
//      to communicate with other nodes. If this node was bound
//      to a system it will lose its binding addresses. A network
//      management tool will be required to re-configure the node.
when (service_pin_state());
    {
    BOOLEAN goUnconfigured;
    unconfig_timer = 6000;      // Set hold time for six seconds.
    goUnconfigured = TRUE;
    // Loop here for six seconds or until the service pin is released.
    while (unconfig_timer > 0)
        {
        // Prevent watchdog reset
        watchdog_update();
        // If the service pin is released before six seconds, do not go
        unconfigured.
        if (!service_pin_state())
            {
            goUnconfigured = FALSE;
            }
        }
    if (goUnconfigured)
        {
        go_unconfigured();
        }
    else
        {
        reset_node();
        }
    }
```

---

It is important to note that although the above source code listing is presented in Neuron C, one skilled in the software arts could easily adapt the source code for other processors and/or other programming languages.

While the invention has been described with respect to a limited number of embodiments, it will be appreciated that many variations, modifications and other applications of the invention may be made.

What is claimed is:

1. A method of placing a node in an unconfigured state, said method comprising the steps of:
   providing input means for receiving an arbitrarily input unconfigured-state command from a user; and
   executing predetermined application software, located internal to a processor connected to the node and with the processor having an input connected to the input means, to respond to the received unconfigured-state command to perform the steps of:
      waiting a predetermined length of time after said unconfigured-state command is received; and
      generating unconfigured-control signals at the processor for output to the node for placing said node in the unconfigured state if said predetermined length of time passes and said unconfigured-state command is still present at said input means.

2. The method according to claim 1, further comprising the step of
   resetting said node if said command is removed from said input means at any time during said predetermined length of time.

3. The method according to claim 1, wherein said input means comprises a push button switch.

4. An apparatus for placing a node in an unconfigured state, comprising:
   input means for receiving an arbitrarily input unconfigured-state command from a user; and
   processor means, connected to the node and having an input connected to the input means, for responding to the received unconfigured-state command to control the node, the processor means including predetermined application software internal to the processor means, for executing:
      means for waiting a predetermined length of time after said command is received; and
      means for generating unconfigured-control signals for output to the node to place said node in the unconfigured state if after said predetermined length of time said command is still present at said input means.

5. The apparatus according to claim 4, further comprising means for resetting said node if said command is removed from said input means at any time during said predetermined length of time.

6. The apparatus according to claim 4, wherein said input means comprises a push button switch.

7. The apparatus according to claim 4, wherein said means for waiting a predetermined length of time comprises a timer.

8. In a node including a Neuron chip, said Neuron chip being part of a LonWorks compatible system, said Neuron chip including a processor and having a service pin electrically coupled to a switch, a method of placing said node in an unconfigured state, said method comprising the steps of:
   detecting when said switch is arbitrarily depressed thus causing the logic level at said service pin to go low, representing an arbitrarily input unconfigured-state command; and
   executing predetermined application software, located internal to the processor connected to the node and having an input connected to the switch, to respond to the received unconfigured-state command to perform the steps of:
      waiting a predetermined length of time; and
      generating unconfigured-control signals at the processor for output to the node for placing said node in the unconfigured state if after said predetermined length of time the logic level at said service pin is still low.

9. The method according to claim 8, further comprising the step of periodically checking the logic level of said service pin during said predetermined length of time.

10. The method according to claim 8, further comprising the step of
    resetting said node if the logic level at said service pin goes high at any time during said predetermined length of time.

11. The method according to claim 8, further comprising the step of resetting said node if said switch is released at any time during said predetermined length of time.

12. An apparatus for placing a node in the unconfigured state, said node including a Neuron chip, said Neuron chip being part of a LonWorks compatible system, said Neuron chip having a service pin electrically coupled to a switch, said apparatus comprising:
    detection means for detecting when said switch is arbitrarily depressed thus causing the logic level at said service pin to go low, representing an arbitrarily input unconfigured-state command; and
    processor means, connected to the node and having an input connected to the switch, for responding to the received unconfigured-state command to control the node, the processor means being internal to the Neuron chip and including predetermined application software, for executing:
       timer means for counting a predetermined length of time; and
       means for generating unconfigured-control signals for output to the node to place said node in the unconfigured state if after said predetermined length of time the logic level at said service pin is still low.

13. The apparatus according to claim 12, further comprising means for checking the logic level of said service pin periodically during said predetermined length of time.

14. The apparatus according to claim 12, further comprising means for resetting said node if said switch is released at any time during said predetermined length of time.

15. The apparatus according to claim 12, further comprising means for resetting said node if the logic level said at said service pin goes high at any time during said predetermined length of time.

16. An electrical device connected to a LonWorks compatible communication system, said electrical device including a Neuron chip having a service pin, said electrical device comprising:
    a housing;
    a switch mounted on said housing so as to permit access thereto by a user for arbitrary switching by the user, said switch connected between said service pin and ground potential;
    detection means for detecting when the logic level at said service pin goes low, representing an arbitrarily input unconfigured-state command; and
    processor means, connected to the node and having an input connected to the switch, for responding to the received unconfigured-state command to control the node, the processor means being internal to the Neuron chip and including predetermined application software, for executing:
       timer means for counting a predetermined length of time; and
       means for generating unconfigured-control signals for output to the node to place said node in the unconfigured state if after said predetermined length of time the logic level at said service pin is still low.

17. The electrical device according to claim 16, wherein said switch comprises a push button switch.

18. The electrical device according to claim 16, further comprising means for periodically checking the logic level at said service pin during said predetermined length of time.

19. The electrical device according to claim 16, further comprising means for resetting said node if said switch is released at any time during said predetermined length of time.

20. The electrical device according to claim 16, further comprising means for resetting said node if the logic level at said service pin goes high any time during said predetermined length of time.

\* \* \* \* \*